United States Patent [19]
Shobert

[11] 3,864,197
[45] Feb. 4, 1975

[54] PLASTIC BEARING

[76] Inventor: Samuel M. Shobert, 17760 Dragoon Trail, Mishawaka, Ind. 46544

[22] Filed: Nov. 14, 1972

[21] Appl. No.: 306,295

Related U.S. Application Data

[60] Division of Ser. No. 1,833, Jan. 9, 1970, abandoned, which is a continuation-in-part of Ser. No. 800,955, Feb. 20, 1969, abandoned.

[52] U.S. Cl............ 161/96, 156/148, 156/194, 156/230, 156/244, 156/247, 161/47, 161/88, 161/89, 161/92, 161/93, 161/94, 161/95, 161/143, 161/189, 308/173, 308/238, 308/DIG. 8
[51] Int. Cl.... F16c 13/00, F16c 13/02, F16c 33/00
[58] Field of Search............ 161/47, 88, 89, 92, 93, 161/94, 95, 143, 189, 90, 96; 308/173, 238, DIG. 8; 156/148, 230, 244, 247, 194

[56] References Cited
UNITED STATES PATENTS

| | | | |
|---|---|---|---|
| 2,553,698 | 5/1951 | Braks | 161/47 |
| 2,885,248 | 5/1957 | White | 308/238 |
| 3,030,248 | 4/1962 | Runton | 161/92 |
| 3,055,788 | 9/1962 | Stanhope et al. | 161/92 |
| 3,131,979 | 5/1964 | Shobert | 308/238 |
| 3,533,668 | 10/1970 | Tunis | 308/238 |

*Primary Examiner*—George F. Lesmes
*Assistant Examiner*—J. Cannon

[57] ABSTRACT

A reinforced plastic bearing comprising a generally cylindrical structure of plastic reinforced with glass fiber, provided with a tubular layer of polytetrafluoroethylene fibers embedded and secured in the plastic. In the fabrication of this bearing, the polytetrafluoroethylene fibers are intertwined and formed into a cord having an irregular outer surface. The intertwining binds the fibers into position to inhibit relative motion thereof such that the cord is characterized by multiple length portions of the fibers in the outer cord surface, having opposite end portions anchored in position. This cord is formed into a woven fabric which becomes said tubular layer and which is impregnated with the aforesaid plastic in liquid form, the plastic flowing into the irregularities and interstices in the fabric and cord so as intimately to enrobe substantial portions of the cords and fibers, thereby securing them in position relative to each other.

One surface of the fabric tubular layer has exposed the lubricous fibers which provide the bearing surface.

Retention of the polytetrafluoroethylene fibers against delamination is, in one preferred method, maximized by use of a mandrel having a highly polished layer of polytetrafluoroethylene thereon. In removing the hardened bearing composite from the mandrel, the integrity of the plastic matrix which secures the polytetrafluoroethylene fibers in place is maintained.

11 Claims, 8 Drawing Figures

PATENTED FEB 4 1975

3,864,197

INVENTOR:
SAMUEL M. SHOBERT,
BY Hood, Gust, Irish & Lundy
ATTORNEY

PLASTIC BEARING

This is a divisional application of application ser. no. 1,833 filed Jan. 9, 1970, now abandoned, which was a continuation-in-part of application ser. no. 800,955, filed Feb. 20, 1969, now abandoned, and is co-pending with divisional application ser. no. 287,566 filed Sept. 8, 1972.

BACKGROUND OF THE INVENTION

1. Field of the Invention

The present invention relates to improvements in plastic bearings and more particularly to bearings which utilize fibers of a fluorocarbon resin such as polytetrafluoroethylene as the lubricous material.

2. DESCRIPTION OF THE PRIOR ART

Reinforced plastic bearings are known. See, for instance, Shobert U.S. Pat. No. 3,131,979, issued May 5, 1964, which discloses a hollow cylindrical bearing conventionally used to support the shafts of small electric motors and the like. This patented bearing utilizes polytetrafluoroethylene-cotton threads to provide the lubricous bearing surface. These threads are bound or locked in position by means of a hardened plastic backing, the material of which intimately surrounds substantial portions of the fibers constituting the threads and in particular penetrates and impregnates the cotton fibers. As a consequence, the lubricous fibers are physically locked in position to thereby serve as the bearing material. As is well known, one of the problems involved in the utilization of polytetrafluoroethylene fibers is that there is no known substance which will wet and chemically bond thereto. In the aforesaid Shobert patent, there is provided a means for locking the lubricous fibers in place even though the plastic material of the hard backing does not bond thereto.

SUMMARY OF THE INVENTION

The present invention relates to an article of manufacture, such as a bearing or seal, which includes a low-friction structure and a hard backing therefor of plastic material. The low-friction structure includes a layer of adjacent cords of fibers of low coefficient of friction material, one surface of the layer being the bearing surface. Each of the cords is characterized by an irregular outer surface containing a plurality of raised and depressed portions. The fibers in each cord are anchored in place in relation to each other by being bundled together and intertwined. The plastic material of the hard backing is not bondable to the low-friction fibers. The cords and fibers constituting the layer are substantially embedded in and thereby secured by the plastic material. Portions of the fibers are exposed through the plastic material for defining the bearing surface.

Even though the material of the fibers, which preferably is polytetrafluoroethylene, is not bondable chemically to any known plastic, the fibers constituting the cord nevertheless are locked into place in the finished structure. This locking results from the particular structure of the cord wherein the fibers are bundled together and intertwined such that they are substantially anchored against relative movement. Further, the resultant cord has an irregular outer surface such that by flowing liquid plastic therearound to provide a solidified mass, the cords in the first instance are anchored against movement by effectively being grasped by the hardened plastic and the fibers likewise are anchored by the plastic as well as by reason of being anchored in the cords themselves.

Thus, it is possible, and indeed a unique feature of this invention, to utilize pure polytetrafluoroethylene fibrous material, without any diluent therein such as cotton or other synthetic fibers, for the purpose of fabricating a bearing. This is in distinct contrast with prior art structures wherein bondable diluents such as cotton have been used in order to anchor the polytetrafluoroethylene fibers in position in a bearing surface.

It is an object of the present invention, therefore, to provide a bearing utilizing fibers of fluorocarbon resin securely retained in position in a manner that the quantity of these fibers that can be incorporated into a bearing surface is maximized thereby to provide a high degree of lubricity.

Another object of this invention is to provide a structure for securing firmly and reliably maximum numbers of polytetrafluoroethylene fibers in position in a bearing surface.

It is yet another object of this invention to provide a structure whereby pure polytetrafluoroethylene strands without a bondable diluent such as cotton are used in the fabrication of bearings.

It is an object to provide a plastic composite bearing which includes two different plastic or resinous materials not chemically or adhesively bondable to each other, one of such materials being in the form of strands of low coefficient of friction material.

The above-mentioned and other features and objects of this invention and the manner of attaining them will become more apparent and the invention itself will be best understood by reference to the following description of an embodiment of the invention taken in conjunction with the accompanying drawings, wherein:

The present invention is not limited to bearings but has application to many different structures wherein bearing surfaces are required to reduce friction between moving surfaces. Also, while the bearings disclosed herein are primarily cylindrical in shape, the principles of this invention may be employed in making other shapes. Generally speaking, the bearing of this invention is fabricated of essentially the same materials as are conventionally used in glass-reinforced plastic fishing rods, golf shafts, archery bows and arrows and the like. As an exception to this, however, a lamination of polytetrafluoroethylene strands is uniquely arranged in the bearing and is combined with the glass-reinforced plastic as will be described in more detail hereinafter. This invention constitutes an improvement on the method and structures appearing in Shobert U.S. Pat. No. 3,131,979.

Figure 1:
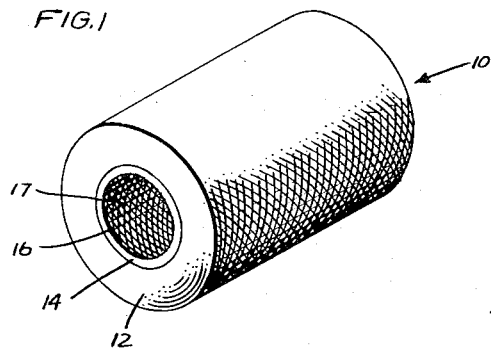
FIG. 1 is a perspective illustration of one bearing embodiment of this invention.
Figure 2:
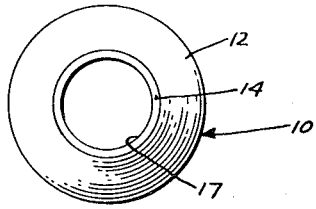
FIG. 2 is an end view thereof.
Figure 3:
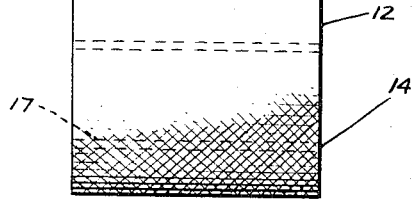
FIG. 3 is a side view.

As shown in FIGS. 1, 2 and 3, the cylindrical bearing indicated generally by reference numeral 10 is composed of essentially two contiguous, coaxial, tubular laminations 12 and 14. In one embodiment of this invention, which will later be described with particularity in connection with FIGS. 7 and 8, the tubular lamination 14 is constructed primarily of polytetrafluoroethylene cords in the form of a helical braid, the basic constituent being a strand of unbleached yarn which in a working embodiment of this invention has 60 filaments and a denier of 400, there being no or zero twist in each strand. Such a strand is presently being marketed under the trademark TEFLON by E. I. Dupont DeNemours & Company, Inc. and is particularly described in a Bulletin No. T-10 dated April 1965 published by the same company and entitled "Properties and Processing of Teflon Fiber." A plurality of these strands, in a working embodiment of this invention, is braided into a woven cord 15 (FIGS. 7 and 8) having an outer surface which is irregular in the sense that it has a multiplicity of longitudinally repeated raised and depressed portions as well as some porosity provided by interstices between fibers (filaments) and the strands themselves. This cord structure will be explained in more detail later on.

Figure 6:
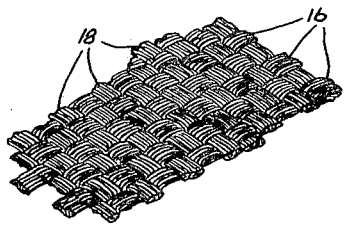
FIG. 6 is an enlarged view of a small area of the interleaved threads or strands in the bearing as woven by the apparatus of FIGS. 4 and 5.

The pattern of the braid forming lamination 14 is graphically illustrated in FIG. 6 and is shown as comprising a plurality of cords 15 identified as 16 and 18, respectively, which are criss-crossed in woven relationship with each of the cords 16 and 18 alternately passing over and under each other as shown. Each cord 16, 18 follows the form of a helix from one end of the bearing 10 to the other.

A second lamination 12 of helically braided glass threads coaxially overlies lamination 14, these threads being braided together in the same pattern as shown in FIG. 6. Both of these laminations 12 and 14 are embedded in epoxy or polyester resin; however, the inner peripheral surface 17 of the lamination 14 has exposed substantial portions of the pure polytetrafluoroethylene fibers which constitute the cords of the lamination 14.

The two laminations 12 and 14 are intimately and rigidly held together by means of the polyester or epoxy resin described hereinabove. The glass threads preferably are of the glass yarn type, commonly referred to as roving, each thread being composed of a multiplicity of tiny elongated fibers, which, in effect, when bundled together form the final continuous length of thread.

Figure 5:
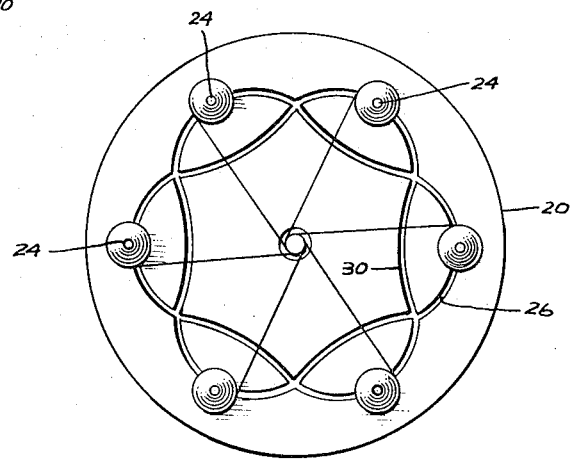
FIG. 5 is a top plan view in diagrammatic form of the apparatus of FIG. 4.
Figure 4:
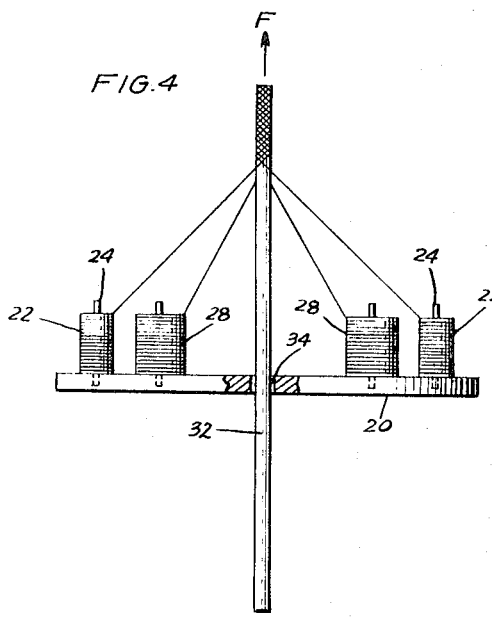
FIG. 4 is a diagrammatical illustration, partly in vertical section, of an apparatus used in the fabrication of this bearing.

A method of fabricating the bearing of the materials thus far described will now be explained. Referring to FIGS. 4 and 5, a conventional braiding machine carries on its supporting table 20 a suitable number (six, in the present instance) of spools 22 and 28 of polytetrafluoroethylene cord 15 or glass thread depending upon the particular stage of processing. At this stage, the spools have the polytetrafluoroethylene cord 15 thereon. These particular spools 22 and 28 are supported on suitable spindles 24 which fit into guide grooves 26 which follow an undulating pattern as illustrated in FIG. 5. There are two series of spools on table 20, the spools 22 being characterized herein as the outer spools while spools 28 are considered as the inner spools. By reference to FIG. 5, it is clearly shown that there are two different undulating grooves 26 and 30 which cross over alternately as illustrated, and the spools 22 and 28, respectively, ride in these grooves.

A mandrel 32, cylindrically shaped, is passed through a clearance opening 34 in table 20 as shown. An operator can hold this mandrel 32 in position and operate it in the proper manner, as will be explained.

Woven cords 15 of polytetrafluoroethylene from the respective spools 22 and 28 are individually affixed to the upper end of mandrel 32 by some suitable means such as by tying with a string or the like. This places the apparatus in readiness for operation.

In operation, mandrel 32 is slowly raised in the direction of the arrow F, while spools 22 and 28 are moved at a uniform rate of speed through the guiding grooves 26 and 30, respectively. Considering for a moment the motion of one spool 22, it will form an interweaving braid with the cords from the spool 28. The mandrel 32 is continuously raised at a uniform rate until the braiding operation is completed for the entire length thereof. The individual cords 15 are then cut and secured against loosening by adhesive tape or string tied tightly around the mandrel, thereby leaving the mandrel 32 with a braided layer of polytetrafluoroethylene. In one embodiment, the cords extending in one helical direction are parallel and contiguous as are the cords extending in the opposite helical direction. This provides a woven fabric having a minimum of visible openings or pores therethrough; however, such pores will in fact exist due to interstices between fibers, strands and in the woven pattern itself. The denseness with which this weaving is performed may be controlled to suit design requirements such as, for example, by controlling the speed at which the mandrel 32 is raised and the tension on the cords 16 and 18 as they pay off the spools 22 and 28.

As the next operation, the mandrel 32 with the first layer 14 of braid just described is passed through another braiding apparatus identical to the one disclosed in FIGS. 4 and 5 but which differs only in the respect that the spools 22 and 28 contain glass threads.

By this means, a helical braid of glass thread is applied to the tubular covering of polytetrafluoroethylene cords 15. Preferably, still a second and in some instances a third layer of glass thread is applied to the mandrel, thereby building up a substantial thickness of glass thread lamination in comparison with the polytetrafluoroethylene lamination. The radial thickness of the lamination 12 is therefore greater than that of lamination 14. The mandrel with its composite covering is next submerged into a catalyzed bath of liquid polyester or epoxy resin material until the threads and cords are soaked or impregnated and embedded. Thereafter, the mandrel with its impregnated covering is placed in a heated curing mold or oven until the resin is completely cured and hardened.

As the last step, the mandrel 32 is removed from the resin-supported laminations 12, 14, the resultant product being a hollow self-supporting tube composed of tubular laminations of resin, glass and polytetrafluoroethylene materials.

Different techniques for impregnating or embedding the composite covering on the mandrel 32 may be employed, such as vacuum impregnation, dipping, brushing and the like. It is important that the impregnation be thorough and that no voids or air pockets exist within the structure. As will later appear, it is important that the resin intimately and substantially engage the polytetrafluoroethylene for the purpose of securing the same in position. It is important to note that the polytetrafluoroethylene braid which is applied to the mandrel 32 is under tension as it is intimately wound or wrapped onto the mandrel such that when the mandrel and its various braided laminations or layers are impregnated with or embedded in the resin, the resin will not penetrate to the mandrel in the areas contacted by the polytetrafluoroethylene fibers but will leave the fibers which are in contact with the mandrel free and clear of any resin. Thus, the finished surface will be relatively smooth and include the fibers and the cords as well as the resin in the spaces between the fibers and cords. The resin engages intimately a sufficient portion of the polytetrafluoroethylene cords and fibers so as to secure these firmly in place, the resin in effect constituting a matrix which holds the cords and fibers in position. The hardened composite tube removed from the mandrel 32, if too long, can be cut into shorter lengths so as to obtain the size bearings depicted in FIGS. 1 through 3.

Figure 7:
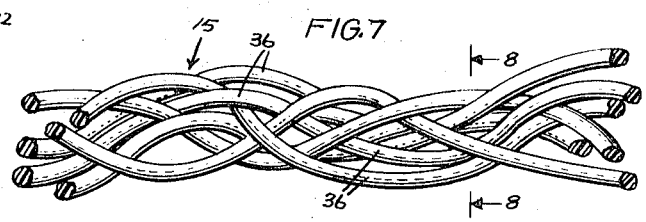
FIG. 7 is a view of a short length of woven cord used in one embodiment of this invention.

The structure of the cord 15 of FIGS. 7 and 8 will now be described. Strands of polytetrafluoroethylene yarn of, for example, 400 denier, 60 filaments or fibers with zero twist are braided together relatively tightly as shown in FIG. 7, these individual strands being indicated by numeral 36. In a particular embodiment shown, six strands 36 are used. These strands are braided together using the apparatus of FIGS. 4 and 5. The finished cord is woven and has, therefore, a multiplicity of raised and depressed portions in the outer surface which causes it to be quite irregular. Inasmuch as there is zero twist in the individual strands 36, there are minute interstices between the fibers. There are also interstices between the strands 36 thereby producing in the cord 15 a degree of porosity and further surface irregularity.

As shown in FIG. 7, the individual strands 36 are undulated repeatedly throughout the length of the woven cord 15, with portions thereof being exposed at the cord surface and other portions being passed over and under other strands so as to be physically intertwined therewith. This intertwining physically locks or anchors the strands and fibers in position subject only to the slight displacement between fibers that is permitted due to the fiber, strand and cord flexibility.

The fibers composing the strands 36 are bundled together such that each strand 36 is easily identified and can be individually handled. These strands 36 are packaged on the spools 22 and 28 of FIGS. 4 and 5 from which they are payed off in braiding or weaving the cord. Obviously, the mandrel 32 would not be used in producing this braided cord 15.

The strands 36, and the fibers composing the strands 36, are anchored in the braid weave of the cord 15 thereby resisting relative displacement therebetween. As these cords 15 are woven into the braid liner or lamination 14 as previously explained, the fibers and strands 36 are further mechanically anchored relative to each other thereby further resisting relative displacement. By reason of the irregular outer surface of the cords 15 as well as the irregularities in the surfaces of the woven fabric, liquid resin which flows around these cords and into the fabric penetrating to a certain degree the various interstices between fibers, strands and cords, the individual fibers have several different forces or media tending to anchor them against displacement.

The irregularity in the cord surface permits resin to flow and form thereabout and thereinto thereby resisting either longitudinal or transverse displacement of the cords 15. The same resin penetrates the interstices between strands 36 holding them in position relative to each other. Further, such resin penetrates at least some of the interstices between fibers additionally anchoring them into place. The resin becomes a holding matrix which ultimately secures and anchors the fibers in position in the bearing surface 16. Some strands and fibers will be completely encased in the matrix. Thus, even though the resin of the hard backing 12 does not wet the fibrous material, still the material is securely anchored in place without any other media such as cotton or the like being required. This permits a maximum amount of lubricous fiber being disposed and distributed throughout the bearing surface 16 thereby enhancing the lubricous qualities of the bearing.

Another design is the strand 36 of pure polytetrafluoroethylene yarn, 400 denier, 60 fibers twisted 11 turns to the inch. This twisted strand or thread may be directly woven into the fabric of FIG. 6 applied directly to the mandrel 32. In a practical embodiment, the mandrel 32 is passed through the braiding mechanism (FIGS. 4 and 5) three times to apply three layers of the polytetrafluoroethylene fabric, the twisted threads in each instance being tensioned during weaving such that the three layers will be intimately and securely compacted together and onto the mandrel 32. The fibers in the woven cord are physically anchored in place by reason of the intertwining and furthermore undulate irregularly and randomly throughout the mass of the cords such that the resin which forms the matrix anchors securely the fibers in place.

It is quite obvious that the cord of FIG. 7 made of six strands 36, whether they be twisted or untwisted, is much larger in cross-sectional area than is one of the twisted strands 36 alone.

A bearing made from a single layer of braided cord of FIG. 7 has different performance characteristics than one made of three layers of twisted strands 36. Experiments have shown that the former bearing can withstand higher radial loading when used as the shaft bearing in an electric motor. The twisted strands 36 in plural layers tend to shear at the interfaces under high loads. In contrast, the bearing having the braided cord has greater wearlife, is more durable, and possesses greater circumferential shear strength. One reason for these differences is believed to be due to the fact that the braided cord of FIG. 7 made of six interlocked strands 36, twisted or untwisted, is much larger in cross-sectional area than is a single cord of twisted strand 36 whereby the resin matrix with the fabric of the braided cord forms a more secure, integrated composite that efficaciously resists delamination, shearing, etc.

The uniqueness of this invention is demonstrated by the fact that when strands 36 with zero twist are directly woven into a fabric such as braided layer 14 without first having been incorporated into a structure like cord 15, the fibers constituting the strands 36 disassociate from the hard backing 12 and in the interior of the bearing 10 appears as a loose, fuzzy or hairy mass. Such an arrangement is indeed unsatisfactory in a bearing structure. In the present invention, the fibers and strands 36 remain intact and provide a smooth and dimensionally stable surface. The reason the fibers and strands 36 become disassociated from the plastic backing 12 as just mentioned is that the plastic of backing 12 during processing does not wet or chemically bond to the polytetrafluoroethylene strands. In the past, in order to secure the strands in place, threads and fabrics made of this material have contained cotton or some similar bondable material which when impregnated with the plastic served to lock the polytetrafluoroethylene fibers in place. Attempts to secure the polytetrafluoroethylene fibers in place without using such bondable material have been unsuccessful especially in connection with high speed bearings.

The present invention makes it possible to obtain a maximum quantity of polytetrafluoroethylene fiber in the lubricous surface of the bearing. This increases the bearing lubricity, the wear life of the bearing and the speeds at which the bearings can be used. Dimensional stability is enhanced by maintaining the thickness of the braid layer 14 to a minimum which means the cord 15 size and the number of strands 36 should also be kept to a minimum.

In another embodiment, the bearing surface includes tiny islands of polytetrafluoroethylene in the form of powder or particles. These particles in combination with the polytetrafluoroethylene fibers provide a highly lubricous bearing surface. The method of incorporating these particles is disclosed and claimed in Tunis application Ser. No. 706,422, filed Feb. 19, 1968, now U.S. Pat. No. 3,533,668, entitled "Reinforced Plastic Bearing and Method for Fabricating Same." These particles are incorporated into the structure of this invention as follows. Prior to applying the braided layer 14 to the mandrel, the latter is immersed in a bath of liquid resin material containing finely divided and evenly dispersed polytetrafluoroethylene particles. The mandrel is removed from the bath and placed in the braiding machine of FIGS. 4 and 5 and the cords 16 and 18 are braided onto the mandrel. The liquid resin suspension which coats the mandrel is squeezed outwardly through and between the cords 16 and 18 which form the layer 14 thereby serving to at least partially impregnate the layer 14. In one working system, the liquid resin is catalyzed epoxy for producing a thixotropic material having a high viscosity. The preferred viscosity of the resin material is approximately 500 to 1,000 cps. The polytetrafluoroethylene particles are of a size of about 1 micron or less in diameter.

Immediately following the braiding of the layer 14, the assembly including mandrel 32 is again immersed in a bath of liquid resin containing polytetrafluoroethylene particles, as just described, and then agitated sufficiently to insure full impregnation of the layer 14 and the cords 16 and 18 thereof.

The mandrel composite now thoroughly impregnated and embedded throughout in the liquid suspension is removed from the bath and once again placed in the braiding machine for the application of the layer or layers 12. When the application of the layers of glass braid has been completed, the entire mandrel and layer assembly is once again immersed in a bath of liquid resin which, in this instance, does not contain the polytetrafluoroethylene particles. However, this resin preferably is of the same composition as that which was used in the suspension for layer 14. The mandrel composite is now treated by heating or otherwise to cure and solidify the resin.

In the initial application of the braided cords 15 (16, 18) to the wetted mandrel, the wrapping force is sufficient to place these cords 16 and 18 into intimate contact with the mandrel surface such that the wet resin is squeezed upwardly past the cords 16 and 18 at the points where they engage the mandrel surface. These cords also may flatten and conform somewhat to the surface of the mandrel 32. This assures, then, that the inner surface of the layer 14 has polytetrafluoroethylene material sufficiently close to the inner surface of the bearing to provide the necessary lubricity. The solidified resin thereby becomes a holding matrix not only for the polytetrafluoroethylene fibers but also the particles. This provides additional lubricous material in the bearing surface.

In a working system, the liquid resin contained a percentage of polytetrafluoroethylene particles ranging from 20% to 50% By volume. By way of upper and lower limits of polytetrafluoroethylene particle content, too much such material will result in destroying the physical, matrix or encapsulating characteristics of the resin, thereby leading to dimensional instability of the entrained polytetrafluoroethylene.

If too small an amount of polytetrafluoroethylene powder is used, the lubrication qualities are diminished.

In a further embodiment, a problem, not heretofore recognized, has been solved for providing a further improvement in anchoring the pure fluorocarbon fibers securely in place. This can best be explained by considering contrasting arrangements.

Conventional mandrels 32 are of highly polished steel which, in some instances, are coated with a release wax commonly used in the fiber-reinforced polyester art. Such a conventional mandrel used as taught in the preceding will yield the results explained. Further improvement in the results, however, are secured by using the same mandrel having secured on the exterior a smooth film or layer of polytetrafluoroethylene. Such polytetrafluoroethylene films and layers are conventionally used in the aforesaid art and also in cookware to prevent sticking of cooked or fried foods. Such polytetrafluoroethylene layers may be made to different degrees of smoothness, it being desired in the present instance that the material as applied to the mandrel 32 have the smoothest possible surface. Known techniques can be used to cover the mandrel 32 with the material.

This mandrel 32 having the polytetrafluoroethylene layer thereon is utilized in the fabrication of the bearings, as already explained. However, it has been discovered that the bearing surface formed adjacent to the polytetrafluoroethylene layer on the mandrel has a glossy smoothness as contrasted with a duller finish as results from use of a conventional mandrel 32 having a polished steel surface of the same degree of smoothness. Further contrast is found in the fact that the polytetrafluoroethylene mandrel provides no trace of delaminations as evidenced by fuzzing of the polytetrafluoroethylene fibers, whereas in the use of the highly polished steel mandrels, close inspection of the bearing surface by the use of magnifying lenses reveals a certain dullness therein and some polytetrafluoroethylene fibers having more exposure through the resin matrix than do the fibers in the surface made on the polytetrafluoroethylene mandrel.

Experiments have proven that there is less tendency of the polytetrafluoroethylene fibers to delaminate and fuzz in the bearings made on the mandrel coated with the polytetrafluoroethylene material than with the highly polished steel mandrel having the usual wax release agent. While the reason for this is not entirely understood, it is believed there is less tendency of the polyester and epoxy resin to wet the polytetrafluoroethylene mandrel than is true of the steel mandrel conventionally treated with a release agent such that when the polytetrafluoroethylene mandrel is withdrawn from the hardened bearing composite, there is less tendency to disturb the hardened resin surface thereby maintaining the integrity of the matrix which secures the polytetrafluoroethylene fibers in place. It is theorized that in the use of a highly polished steel mandrel conventionally treated, microscopic particles of the resin surface are torn away as the mandrel is removed from the hardened bearing composite, such that many of the polytetrafluoroethylene fibers have less matrix resin in contact therewith than is true when the polytetrafluoroethylene coated mandrel is used. Even though the polish on the steel may be higher than that of the polytetrafluoroethylene coating, still the dullness of the bearing surface suggests that minute particles or portions of the polyester or epoxy resin are separated from the bearing surface at the time the mandrel is removed.

Recapitulating, use of the polytetrafluoroethylene coated mandrel 32 provides a release which does not tear away minute particles of the matrixing resin when the mandrel is stripped out of the bearing piece. In the use of mandrels which do not have as good release characteristics, stripping the mandrel out of the finished piece results in tearing away minute particles of the matrixing resin which in turn can result in dislodgement of the polytetrafluoroethylene fibers or at least releases them such that delamination and fuzzing can occur. Thus, it is theorized that there is a definite connection between the securing of the pure polytetrafluoroethylene fibers in position and the release properties of the mandrel 32. In use of the coated mandrel, the tiny islands or particles of matrixing resin which serve to encapsulate the tiny polytetrafluoroethylene fibers are not disturbed, thereby resulting in the retention of the matrix integrity.

Based on the theory that the degree of smoothness as well as the mandrel material are characteristics important in maintaining the integrity of the resin matrix it indeed is intended that alternative equivalent materials be included within the comprehension of this invention. In particular, polytetrafluoroethylene resin has been identified as one specific material that will produce the salutary results. Other materials having the potential of being equally efficacious is another fluorocarbon resin known as "fluoroethylene polymer."

Recapitulating, in providing an improved bearing utilizing polytetrafluoroethylene as the lubricous material, certain design desiderata are important as follows. The matrixing resin should be undisturbed as much as possible upon withdrawal of the mandrel from the bearing piece. The fibers of the polytetrafluoroethylene should be formed into a cord having radial depth with each fiber alternating throughout the cord mass from deep embedment to being exposed at the surface thereof, this being accomplished by forming a woven cord as shown in FIG. 7. The cord composed of undulated, intertwined, interlocked fibers, having radial depth, is intimately engaged by encapsulating matrix resin, thereby anchoring in place those polytetrafluoroethylene fibers exposed at the bearing surface.

This invention is generally unique in that it provides methods and structures for joining two materials toether which are not chemically or adhesively bondable to each other, examples of these materials being the ones identified hereinabove. This invention, therefore, is not limited to the particular materials in the fibers, strands, cords and plastic backing, as there are other materials of like descriptive property which are not chemically bondable but which can be physically secured together as comprehended by this invention.

The word "intertwine" appearing in the claims and written description is used in its broadest sense to means to unite or become mutually involved by twining one with another, to entangle, interlace, intertwist, or to interweave.

The material polytetrafluoroethylene is a fluorocarbon resin having low coefficient of friction properties. It is intended that other compositions of this resin exhibiting the properties of polytetrafluoroethylene be included in the coverage provided by this patent as well as other plastic or resinous materials which possess properties of low coefficient of friction.

Figure 8:
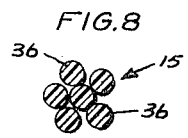
FIG. 8 is a cross-section taken substantially along section line 8—8 of FIG. 7.

The cord 15 design of FIGS. 7 and 8 of only polytetrafluoroethylene fibers as described provides for a maximum amount of lubricous material in the bearing surface since no diluent such as cotton is used therein. The cord 15 is relatively large in cross-section thereby providing a relatively deep (radially) mass of bearing material providing a corresponding degree of wear life. The fibers constituting the bearing mass are held in place by reason of the intertwining provided by the cord configuration and the intimate embedment in the plastic backing. Delamination is thus avoided.

Even though no cotton or other bondable mmaterial is used in the cord 15, the lubricous fibers are firmly secured in place in a bearing mass of maximized radial depth as well as in lubricous material.

While there have been described above the principles of this invention in connection with specific apparatus, it is to be clearly understood that this description is made only by way of example and not as a limitation to the scope of the invention.

What is claimed is:

1. An article of manufacture comprising a low-friction structure and a hard backing therefor, said hard backing including a plastic material, said low-friction structure having a bearing surface comprising adjacent cords of strands of low coefficient of friction material, each strand consisting of low coefficient of friction material in fiber form and said low coefficient of friction material including fluorocarbon resin, each cord having an irregular outer surface containing a plurality of raised and depressed portions, said strands in each cord being woven together for locating said fibers in place in relation to each other, said cords being interlaced together in a woven fabric which further anchors said fibers against displacement, said cords and fibers being substantially embedded in said plastic material such that the latter mechanically secures said cords and fibers in position, said fibers being undulated throughout the length of said cords with portions of said fibers being exposed through said plastic material to define said bearing surface and other portions being fully embedded in said plastic material, said plastic material not being chemically or adhesively bonded to said fibers or cords.

2. The article of claim 1 in which the strands of each cord are braided together, at least a portion of said fibers and cords having interstices therebetween which are substantially filled by said plastic material, said plastic material not being chemically or adhesively bonded to any of said fibers or cords.

3. The article of claim 2 in which said hard backing is of annular shape and having inner and outer peripheral surfaces, said low-friction structure also being annular and secured to one of said peripheral surfaces, said cords being braided into a seamless cylinder, one portion of said cords extending in the form of a helix in one circumferential direction alternately over and under another portion of cords, said cords being contiguous so as to provide a substantially continuous bearing surface of low-friction fibers.

4. The article of claim 2 in which said strands are twisted thereby further anchoring said fibers relative to each other.

5. The article of claim 1 in which each strand is of about 400 denier, and includes about 60 fibers.

6. The articles of claim 1 in which said hard backing is of annular shape and having inner and outer peripheral surfaces, said low-friction structure also being annular and secured to one of said peripheral surfaces.

7. The article of claim 6 in which said low friction material is polytetrafluoroethylene.

8. An article or manufacture comprising a low-friction structure and a hard backing of fiber reinforced plastic therefor, said low-friction structure having a bearing surface comprising adjacent cords of strands consisting of polytetrafluoroethylene fibers, each cord having an irregular outer surface containing a plurality of raised and depressed portions, said strands in each cord being braided together for locating said fibers in place in relation to each other, said cords being interlaced together in a woven fabric which further anchors said fibers against displacement, said cords and fibers being substantially embedded in said plastic material such that the latter mechanically secures said cords and fibers in position, said fibers being undulated throughout the length of said cords with portions of said fibers being exposed through said plastic material to define said bearing surface and other portions being fully embedded in said plastic material, said plastic material not being chemically or adhesively bonded to said fibers or cords.

9. The article of claim 8 in which said hard backing is of annular shape and having inner and outer peripheral surfaces, said low-friction structure also being annular and secured to one of said peripheral surfaces, said cords being braided into a seamless cylinder, one portion of said cords extending in the form of a helix in one circumferential direction alternately over and under another portion of said cords, said cords being contiguous so as to provide a substantially continuous bearing surface of low-friction fibers.

10. The article of claim 8 in which said strands are twisted thereby further anchoring said fibers relative to each other.

11. The article of claim 8 in which said hard backing is of annular shape and having inner and outer peripheral surfaces, said low-friction structure also being annular and secured to one of said peripheral surfaces.

* * * * *